No. 710,500. Patented Oct. 7, 1902.
G. E. McELROY.
VARIABLE SPEED GEARING.
(Application filed Jan. 23, 1902.)
(No Model.) 3 Sheets—Sheet I.
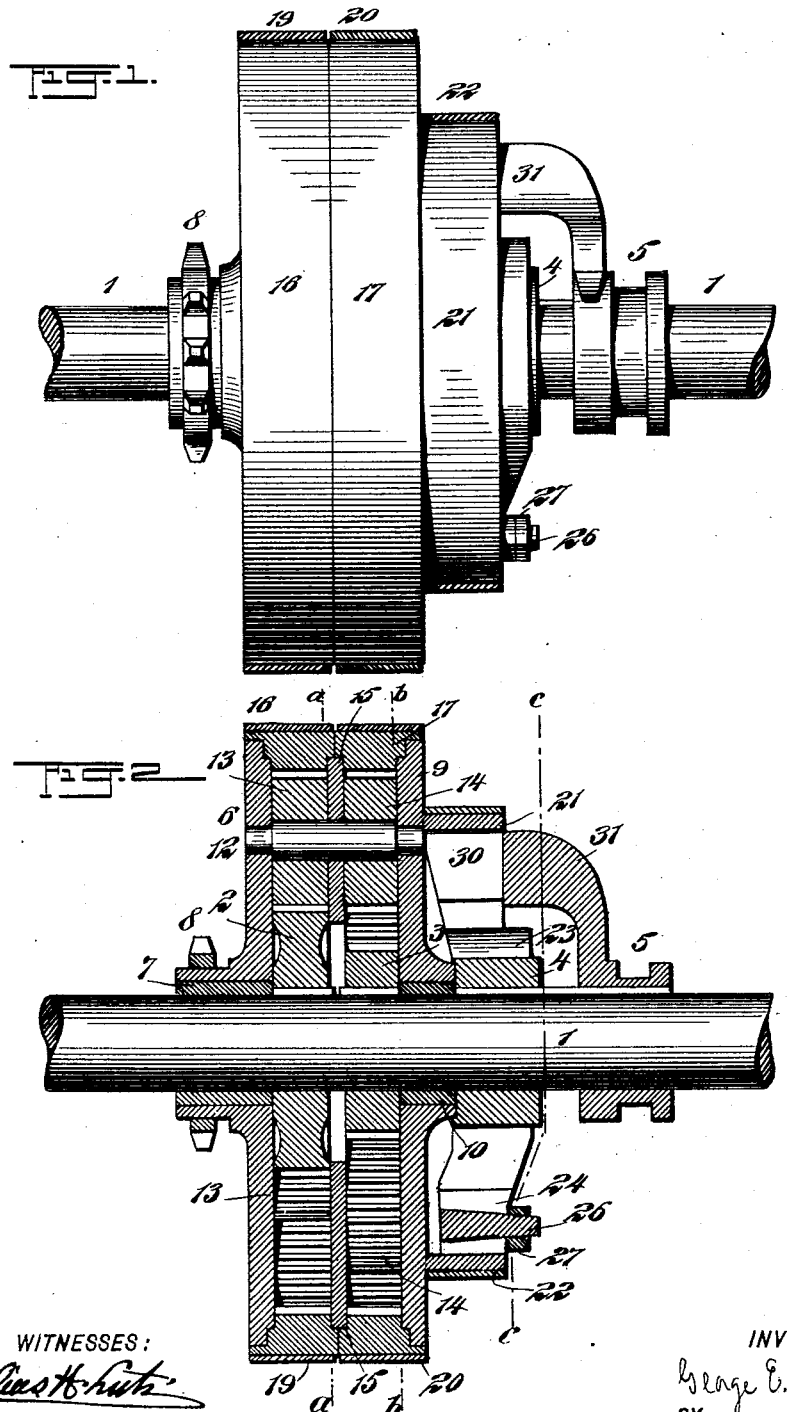
WITNESSES:
INVENTOR
George E. McElroy,
BY
ATTORNEY.

No. 710,500. Patented Oct. 7, 1902.
G. E. McELROY.
VARIABLE SPEED GEARING.
(Application filed Jan. 23, 1902.)
(No Model.) 3 Sheets—Sheet 2.
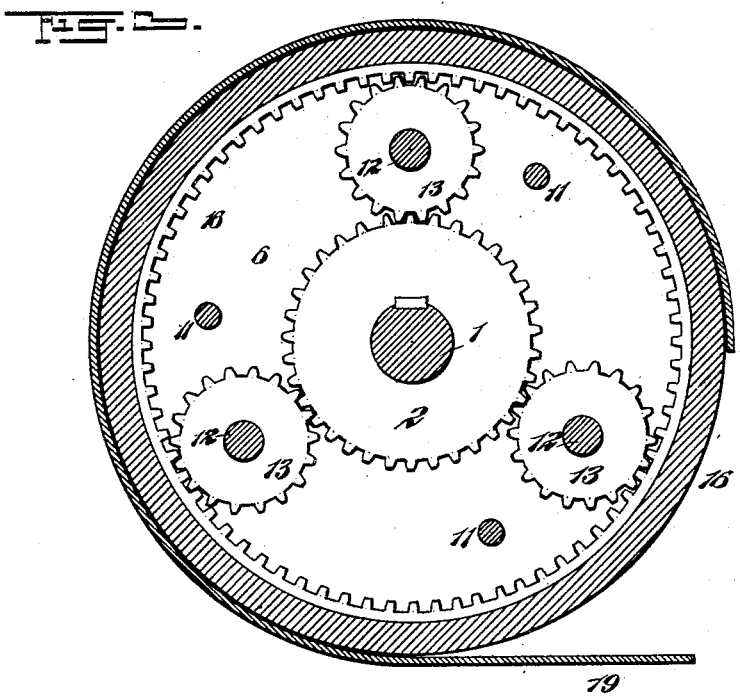
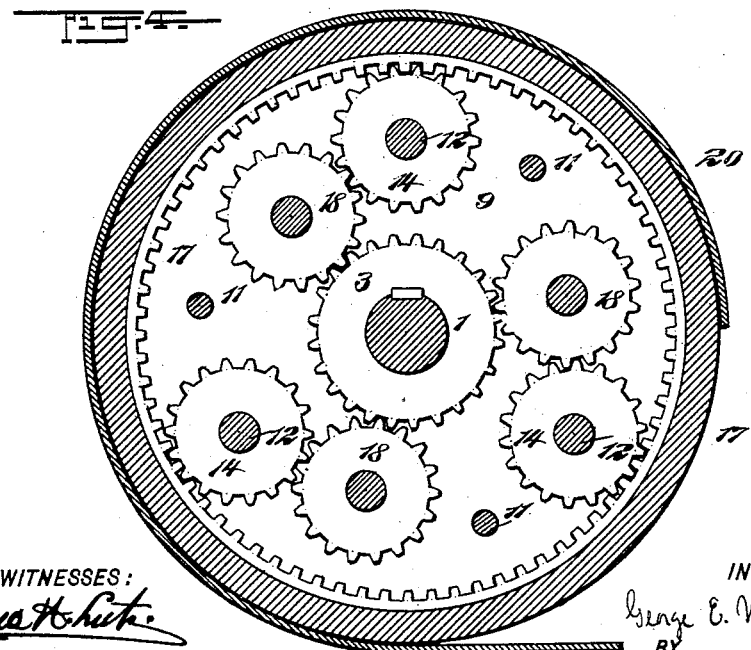
WITNESSES:
INVENTOR
George E. McElroy
BY A. M. Pierce
ATTORNEY.

No. 710,500. Patented Oct. 7, 1902.
G. E. McELROY.
VARIABLE SPEED GEARING.
(Application filed Jan. 23, 1902.)

(No Model.) 3 Sheets—Sheet 3.

FIG. 5.

WITNESSES:
Julius H. Kurtz
L. Du Brul.

INVENTOR
George E. McElroy.
BY A. M. Pierce
ATTORNEY.

UNITED STATES PATENT OFFICE.

GEORGE E. McELROY, OF BROOKLYN, NEW YORK, ASSIGNOR TO THE CHAMPION MFG. CO., OF BROOKLYN, NEW YORK.

VARIABLE-SPEED GEARING.

SPECIFICATION forming part of Letters Patent No. 710,500, dated October 7, 1902.

Application filed January 23, 1902. Serial No. 90,886. (No model.)

*To all whom it may concern:*

Be it known that I, GEORGE E. MCELROY, a citizen of the United States, residing in Brooklyn, Kings county, State of New York, have invented a new and useful Improvement in Variable-Speed Gearing, of which the following is a specification.

My invention relates especially to the construction and arrangement of devices for changing the speed or direction of rotation in driving mechanism connected with an actuating engine or motor, and has for its object the provision of a simple, compact, and effective gear which accomplishes these results.

To attain the desired end, my invention consists in certain novel and useful combinations or arrangements of parts and peculiarities of construction and operation, all of which will be hereinafter first fully described, and then pointed out in the claims.

In the accompanying drawings, forming a part hereof, Figure 1 is a side elevation of a speed and direction changing gear embodying my invention. Fig. 2 is a vertical axial sectional view thereof. Fig. 3 is a sectional view at line $a\ a$ of Fig. 2. Fig. 4 is a like view at line $b\ b$ of the same figure. Fig. 5 is a face view looking from the right of Fig. 1 at line $c\ c$.

Similar numerals of reference wherever they occur indicate corresponding parts in all the figures.

1 is a shaft connected to an engine or motor in any desired manner.

2 and 3 are gear-wheels permanently keyed to the shaft 1.

4 is a clutch member also permanently keyed upon the shaft 1, and 5 is a clutch member also keyed upon the said shaft, but free to move longitudinally thereon.

6 is a disk or plate provided with a bushing 7 upon the shaft 1 and arranged to rotate thereon or therewith.

8 is a sprocket-wheel carried by the disk 6.

9 is a second disk or plate provided with a bushing 10, said disk being also arranged to rotate upon the shaft 1 or therewith. The two disks 6 and 9 are secured together by means of pins or screws 11. (Shown in Figs. 3 and 4 of the drawings.)

12 represents shafts passing between the two disks 6 and 9. 13 and 14 are gears mounted upon said shafts, the gears being separated by washers 15, made of suitable material.

16 and 17 are two internal gears supported upon the peripheries of the disks 6 and 9 and upon the washers 15. The internal gear 16 meshes with the gears 13, which in turn mesh with the gear 3, and the internal gear 17 meshes with the gears 14, which in turn mesh with intermediate gears 18, meshing with the gear 3 upon the shaft 1.

19 and 20 are brake-bands which encircle the internal gears 16 and 17, respectively.

Projecting from the face of the disk 9 is a ring 21, surrounded by a brake-band 22, said ring 21 inclosing the clutch member 4. Extending from said member 4 are two curved arms 23, provided at 24 with bosses, in each portion of which is formed part of a tapering perforation designed to receive a corresponding tapered adjusting-pin 26, carrying regulating-nuts 27. The two arms 23 pass to the right and left from the bosses 24, forming segments 29 of a ring, their free extremities terminating in faces 30, between which a wedge-shaped figure 31, projecting from the clutch member 5, is arranged to enter for causing the clutch to engage the ring 21.

The operation of my device is as follows: Rotary motion being imparted to the shaft, the clutch mechanism and the gears keyed thereon rotate, carrying the internal gears 16 and 17 without imparting any movement to the disks 6 and 9 and the sprocket 8. By tightening the band 19 the internal gear 16 is held against movement, causing the gear 2 and the gear 13 to rotate the disk 6 forward at a slow speed, the internal gear 20 traveling therewith. If it is desired to reverse the motion of the disks and sprocket, the band 20 is tightened, (band 19 being loose,) holding the internal gear 17 against movement, and through the medium of such gear and the gears 14, 18, and 3 the such reversal of motion will be accomplished. In order to obtain full speed of movement in a forward direction, the clutch member 5 is turned inward, the finger 31 causing the clutch to engage, locking all the parts of the device together and causing them to rotate with the speed of the shaft 1.

It will thus be seen that I have produced a variable-speed gearing very simple and compact, wherein the parts are greatly reduced in number, by which the efficiency of the device is not impaired. By providing the wide bearings for the disks 6 and 9 the wear and friction upon the shaft are spread over a much greater surface, preventing cutting. The adjusting mechanism for regulating the clutch-ring movement enables me to set the clutch accurately, and the band upon the ring 21 provides a very effective emergency-brake.

Having now fully described my invention, what I claim as new therein, and desire to secure by Letters Patent, is—

1. The combination with a driving-shaft, two gears fixed thereon, of two connected disks rotatably mounted upon the driving-shaft, a sprocket connected with said disks, two sets of gears mounted upon shafts passing between the disks, one set of gears meshing with one of the gears fixed upon the driving-shaft, and the other set of gears meshing with intermediate gears which in turn mesh with the other gear fixed upon the driving-shaft, the shafts passing between the disks, the intermediate gears, two independent loose internal gears engaging the gears mounted upon the shafts passing between the disks; means for holding either of said internal gears against rotation, and means for locking the disks to the driving-shaft, substantially as shown and described.

2. The combination with a driving-shaft, two gears fixed thereon, of two connected disks rotatably mounted upon the driving-shaft, a sprocket connected with said disks; two sets of gears mounted upon shafts passing between the disks, one set of gears meshing with one of the gears fixed upon the driving-shaft, and the other set of gears meshing with intermediate gears which in turn mesh with the other gear fixed upon the driving-shaft, the shafts passing between the disks, the intermediate gears, two independent loose internal gears engaging with the gears mounted upon the shafts passing between the disks, and means for holding either of said internal gears against rotation, substantially as shown and described.

Signed by me, at New York city, this 22d day of January, 1902.

GEORGE E. McELROY.

Witnesses:
A. M. PIERCE,
L. DU BRUL.